(12) United States Patent
Malenfant et al.

(10) Patent No.: US 10,044,725 B2
(45) Date of Patent: Aug. 7, 2018

(54) CONTROLLING ACCESS TO ONLINE RESOURCES USING DEVICE VALIDATIONS

(71) Applicant: Google Inc., Mountain View, CA (US)

(72) Inventors: Aaron Malenfant, Redwood City, CA (US); Haidong Shao, Sunnyvale, CA (US); Jason Fedor, Sunnyvale, CA (US); Jiexing Gu, San Jose, CA (US); Wei Liu, San Jose, CA (US); Hongshu Liao, Mountain View, CA (US); Ying Liu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 34 days.

(21) Appl. No.: 14/973,842

(22) Filed: Dec. 18, 2015

(65) Prior Publication Data

US 2017/0180384 A1 Jun. 22, 2017

(51) Int. Cl.
*H04L 29/06* (2006.01)

(52) U.S. Cl.
CPC ............ *H04L 63/102* (2013.01); *H04L 63/12* (2013.01)

(58) Field of Classification Search
CPC ............................ H04L 63/102; H04L 63/12
USPC .................................................... 726/4, 5, 7
See application file for complete search history.

(56) References Cited

U.S. PATENT DOCUMENTS

| | | | |
|---|---|---|---|
| 7,929,805 B2 | 4/2011 | Wang et al. | |
| 8,739,264 B1* | 5/2014 | Eddings | G06F 21/35 726/10 |
| 9,544,137 B1* | 1/2017 | Brandwine | H04L 9/083 |
| 2012/0159586 A1 | 6/2012 | Carney et al. | |
| 2013/0312070 A1 | 11/2013 | Raffle et al. | |
| 2014/0041005 A1* | 2/2014 | He | H04L 63/08 726/7 |
| 2014/0173695 A1* | 6/2014 | Valdivia | G06F 21/36 726/4 |
| 2014/0250502 A1 | 9/2014 | Lauer | |
| 2015/1004089 | 2/2015 | Oberheide et al. | |
| 2016/0065558 A1* | 3/2016 | Suresh | H04L 63/08 726/7 |
| 2016/0127416 A1* | 5/2016 | Park | H04W 4/008 726/1 |
| 2017/0093536 A1* | 3/2017 | Yoganathan | H04L 67/04 |

OTHER PUBLICATIONS

International Search Report for PCT/US2016/065251, dated Apr. 7, 2017, 13 pages.

(Continued)

*Primary Examiner* — Jahangir Kabir
(74) *Attorney, Agent, or Firm* — Dority & Manning, P.A.

(57) ABSTRACT

Systems and methods of verifying a user are provided. In particular, a request to engage in a verification process to gain access to an online resource can be received. The request can be provided by a first user device associated with a user. A validation request associated with a second user device associated with the user can be received. The validation request can include a device profile associated with the second user device. It can then be determined whether to validate the second user device based at least in part on the device profile. When it is determined to validate the second user device, the first user device can be granted access to the online resource.

20 Claims, 6 Drawing Sheets

(56) References Cited

OTHER PUBLICATIONS

Hiltgen et al., "Secure Internet Banking Authenticatiom" Security & Privacy, IEEE, IEEE Service Center, Los Alamitos CA, Mar. 1, 2006, pp. 24-32.
Hiltgen et al., "Secure Interact Banking Authentication." Security & Privacy, IEEE, IEEE Service Center, Los Alamitos, CA, Mar. 1, 2006, pp. 24-32.

\* cited by examiner

CONTROLLING ACCESS TO ONLINE RESOURCES USING DEVICE VALIDATIONS

FIELD

The present disclosure relates generally to verifying user devices, and more particularly to verifying user devices based at least in part on a validation response associated with a user device.

BACKGROUND

Trust is an asset in web-based interactions. For example, a user must trust that an entity provides sufficient mechanisms to confirm and protect her identity or other confidential information in order for the user to feel comfortable interacting with such entity. Further, an entity that provides a web-resource must be able to block automated attacks that attempt to gain access to the web-resource for malicious purposes. Thus, sophisticated authentication mechanisms that can discern between a resource request originating from a human being and a request generated by an automated machine are a vital tool in ensuring that web-resources are protected from automated attacks and developing the necessary relationship of trust between a resource provider and a user.

CAPTCHA systems ("completely automated public Turing test to tell computers and humans apart") can provide such an authentication mechanism. One goal of a CAPTCHA system is to exploit situations in which it is known that humans perform tasks better than automated machines. Thus, as part of a verification process, CAPTCHA systems can provide a challenge that is solvable by a human but generally unsolvable by a machine.

Having access to a physical mobile user device, such as a smartphone, tablet wearable computing device, etc. can suggest or indicate a human user. In this manner, one or more signals indicative of the presence of a mobile device associated with a user can be used to verify the user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of verifying a user. The method includes receiving, by one or more computing devices, a request to engage in a verification process to gain access to an online resource. The request is provided by a first user device associated with a user. The method further includes receiving, by the one or more computing devices, a validation request from a second user device associated with the user. The validation request comprises a device profile associated with the second user device. The method further includes determining, by the one or more computing devices, whether to validate the second user device based at least in part on the validation request. The method further includes, when it is determined to validate the second user device, granting, by the one or more computing devices, the first user device access to the online resource.

Other example aspects of the present disclosure are directed to systems, apparatus, tangible, non-transitory computer-readable media, user interfaces, memory devices, and electronic devices for verifying user devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
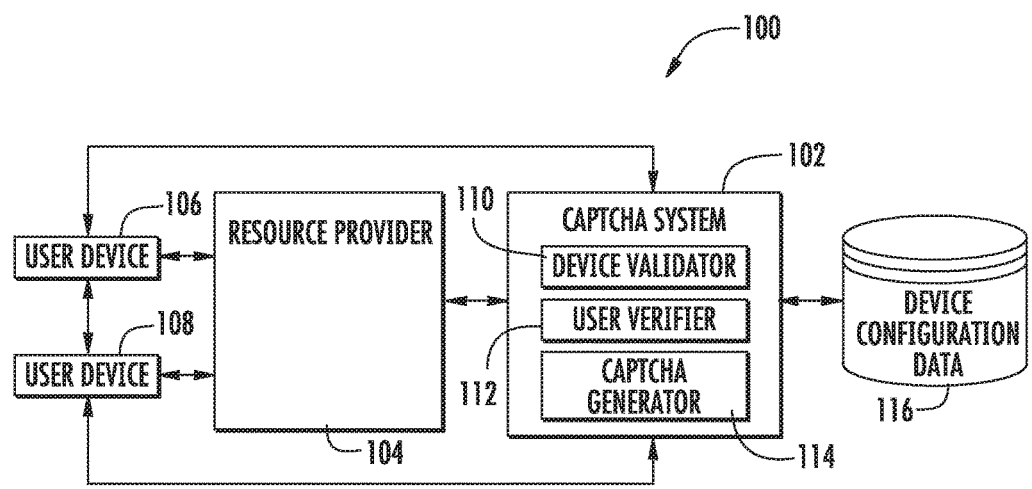
FIG. 1 depicts an overview of an example system for verifying a user device according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to verifying a user device. For instance, a verification system can receive a request to engage in a verification process. The request can be provided by a first user device associated with a user. Subsequent to receiving the verification request from the first user device, the verification system can receive a validation request from a second user device. The verification system can determine whether to validate the second user device based at least in part on the validation request. The verification system can then determine whether to verify the first user device based at least in part on the determination of whether to validate the second user device. For instance, when it is determined to validate the second user device, the verification system can verify the first user device, such that the first user device may access the online resource.

As an example, a user may sit down at a first user device (e.g. a desktop or laptop computing device) and attempt to access an online resource such as an email account associated with the user. In response to this attempt by the user, the first user device may provide a request to engage in a verification process to a verification system. The verification process can be used by the verification system to determine whether to grant the user and/or the first user device access to the online resource. In some implementations, the first user device may be verified based at least in part on a second user device, such as a smartphone associated with the user. The smartphone may determine a device profile associated with the smartphone and provide the device profile to the verification system. The verification system may then validate the smart phone based at least in part on the device profile. When the smartphone is validated, the first user device may be verified, such that the user device is granted access to the online resource. The user may then access the online resource using the user device.

In some implementations, in response to the receiving the request to engage in the verification process, the verification system can provide a challenge token to the user device. In some implementations, the challenge token can then be forwarded (e.g. using a Bluetooth connection) to the second user device (e.g. smartphone) associated with the user. The second user device can determine a device profile associated with the second user device, and provide the user profile to the verification system along with a validation request. For instance, the device profile may be indicative of one or more hardware and/or software configurations of the second user device. The verification system can determine whether to validate the second user device based at least in part on the validation request and the device profile. In some implementations, when it is determined to validate the second user device, the verification system can verify the first user device, such that the first user device may access the online resource. In some implementations, when it is determined not to validate the second user device, a verification challenge can be provided to the first user device. In such implementations, verification of the first user device can further be determined based at least in part on one or more user responses to the verification challenge.

In some implementations, the verification challenge can be a completely automated public Turing test to tell computers and humans apart (CAPTCHA) challenge provided by a computerized CAPTCHA system to verify the legitimate human status of the user, thereby preventing "bots" from damaging the online service. For instance, the CAPTCHA system can provide a CAPTCHA challenge to the user, and the user can gain access to the online service if the user "passes" the challenge. In some implementations, the verification challenge can be an image based challenge including instructions prompting the user to solve the challenge through interaction with one or more images. Other suitable verification challenges can include challenges that present distorted text to a user, challenges that present an audio file to a user, challenges that present a video file to a user, and/or various other suitable verification challenges. In some implementations, the verification system can select a challenge type, a challenge difficulty, and/or a challenge format to be provided to the user device. In particular, the challenge type, challenge difficulty, and/or challenge format may be selected based at least in part on the device profile and/or the validation response associated with the user device.

As used herein, a user device can be a laptop computer, desktop computer, smartphone, tablet, wearable computing device, or any other suitable user computing device. In various implementations, the first user device can be a mobile user device (e.g. a smartphone, tablet, wearable computing device, etc.) or a non-mobile user device (laptop computer, desktop computer, etc.). For instance, in some implementations, a user can request access to an online resource or service from a mobile user device. For instance, a user may request access to the online resource or service through a web browser associated with the user device as part of a web session. In such implementations, the mobile user device can determine a device profile associated with the mobile user device. For instance, in some implementations, data indicative of the web session and/or the request for access to the online resource may be forwarded to an application associated with the user device configured to determine a device profile for the user device. The device profile can be determined, for instance, based at least in part on one or more software characteristics and/or hardware characteristics of the mobile user device. The device profile can be provided to a verification system in or along with a validation request.

In some embodiments in which the systems and method discussed herein utilize information about users and/or user devices, such as device type, device location, user participation in web-services, or other information, the users may be provided with an opportunity to control whether programs or features collect or utilize such information. In addition, in various embodiments, certain information or data can be treated in one or more ways before it is stored or used so that personally identifiable information is removed.

In response to the validation request, the verification system can determine whether to validate the mobile user device based at least in part on the device profile. In this manner, the verification system may determine a validation response for the mobile user device indicative of either a validated device or a non-validated device. For instance, a positive validation response can correspond to a validated user device, and a negative validation response can correspond to a non-validated user device. Determining whether to validate the mobile user device can include, for instance, comparing the device profile against one or more acceptable device configurations. The mobile user device can be validated (e.g. achieve a positive validation response) if the device profile aligns with or otherwise matches at least one of the one or more acceptable device configurations. In example implementations, data indicative of the one or more acceptable device configurations can be stored in one or more databases at the verification system or in a separate location. The mobile user device can then be verified and granted access to the online resource based at least in part on the validation response. In some implementations, the determination of whether to verify the mobile user device can further be based on various additional factors, such as a phone number associated with the user device, one or more online accounts associated with the user device, one or more wireless (e.g. Bluetooth) connections associated with the user device, a number of CAPTCHA challenges previously solved by the user device, and/or various other suitable factors).

As indicated, in some implementations, the first user device can be a non-mobile user device. For instance, a user may request access to an online resource or service from a non-mobile user device during a web session. In such implementations, the web session may then be connected to a second user device. The second user device can be a mobile user device. Connecting the web session to the second user device may include forwarding a challenge token from the first user device to the second user device. For instance, in response to receiving the request to access the online resource, the verification system can provide a challenge token to the first user device. The challenge token can include an identifier associated with a communication session between the verification system and the first user device. The challenge token can then be forwarded to the second (e.g. mobile) user device. For instance, in some implementations, a determination can be made as to whether the first user device is a mobile user device or a non-mobile user device. In such implementations, when it is determined that the first user device is a non-mobile user device, the challenge token can be provided to the second user device. In example implementations, the challenge token can be provided to the second user device using Bluetooth, barcode, sound waves, and/or various other suitable communication techniques.

The second user device can then determine a device profile, and send the device profile to the verification system as part of (or along with) a validation request. The verification system can determine a validation response based at least in part on the device profile. The first user device can then be verified based at least in part on the validation response for the second user device. For instance, when the second user device achieves a positive validation response, the first user device can be verified and granted access to the online resource or service. As another example, when the second user device achieves a negative validation response, the verification system may provide a verification challenge to the first user device. The first user device may then be verified based at least in part on one or more user responses to the verification challenge.

As described, in some implementations, the verification system may verify the user without sending the user a verification challenge. For instance, the verification system may not provide a verification challenge to a user device if the user device (or a second user device) achieves a positive validation response. In other implementations, the verification system may adjust the difficulty of a verification challenge based at least in part on the validation response. For instance, the verification system may provide a low difficulty verification challenge to a user device having an associated positive validation response.

Once the verification system has been sufficiently convinced that the user device is operated by a human (e.g. based at least in part on the validation response for the first or second user device, or based at least in part on one or more user responses to the verification challenge), the verification system can verify the first user device by providing a verification token or certificate to the first user device. In some implementations, the first user device can then provide the verification token to the resource provider associated with the online resource or service. In turn, the resource provider can confirm the validity of the verification token with the verification system. Upon confirmation of token validity, the resource provider can provide the resource or service to the user computing device.

In some implementations, the first user device can receive a request to access an online resource from a user, and in response, the second user device can send an independent verification request to the verification system. The verification system can then determine whether to verify the second user device. When the second user device is verified, the second user device can receive a verification token from the verification system. The token can then be input into the first user device, for instance, through user interaction with the first user device. The first user device can then be granted access to the online resource based at least in part on the verification token sent to the second user device.

With reference now to the figures, example aspects of the present disclosure will be discussed in more detail. For instance, FIG. 1 depicts an overview of an example system 100 for verifying a user device. In particular, system 100 can include a computerized CAPTCHA system 102 and a resource provider 104. In some implementations, CAPTCHA system 102, and/or resource provider 104 can communicate with each other over a network.

CAPTCHA system 102 can be implemented using one or more computing devices, such as, for example, one or more servers. CAPTCHA system 102 can be configured to validate user devices. CAPTCHA system 102 can further be configured to provide verification CAPTCHA challenges to a user device in response to a verification request from a user device. In some implementations, the verification challenges can be image based CAPTCHA challenges, text based challenges, audio based challenges, video based challenges, and/or various other suitable challenges. Such challenges can have associated instructions prompting a user to solve the challenge by interacting with the CAPTCHA challenge.

For instance, CAPTCHA system 102 can include a device validator 110. Device validator 110 can be configured to validate a user device in response to a validation request from the user device. For instance, in response to receiving a challenge token from CAPTCHA system 102, a user device, such as user device 106 or 108 can determine a device profile associated with the user device. As indicated the device profile can be determined based at least in part on one or more hardware and/or software characteristics of the user device. The user device can provide the device profile to device validator 110 along with a validation request. Device validator 110 can then determine whether to validate the user device based at least in part on the device profile. For instance, device validator 110 can access device configuration data from device configuration database 116 to determine if the device profile associated with the user device matches or otherwise aligns with one or more acceptable device configurations stored in device configuration database 116. If the device profile matches an acceptable device configuration, device validator 110 can validate the user device by assigning the user device a positive validation response. If the device profile does not match an acceptable device configuration, device validator can assign the user device a negative validation response. In some implementations, a device profile that does not match any acceptable device configuration may not be dispositive of the invalidation of the user device. In such implementations, one or more additional factors may be considered in determining the validation response associated with the user device, such as participation in one or more online accounts, a phone number, etc.

CAPTCHA system 102 further includes a user verifier 112. User verifier 112 can be configured to verify a user and/or user device based at least in part on the validation response associated with a user device. For instance, in some implementations, user verifier 112 can verify a first user device (e.g. user device 106) based at least in part on the validation response associated with user device 106. In some implementations, user verifier 112 can verify user device 106 based at least in part on a validation response associated with a second user device (e.g. user device 108). For instance, if user device 106 is a mobile user device, user verifier 112 can determine whether to verify user device 106 based at least in part on the validation response associated with user device 106. In such implementations, a request to access an online resource may originate from a web browser displayed on user device 106 during a web session. Data indicative of the web session can then be provided to an application associated with user device 106 configured to determine or access a device profile associated with user device 106, and to provide the device profile to CAPTCHA system 102. User verifier 112 can then determine whether to verify (e.g. grant user device 106 access to the online resource) based at least in part on the device profile and/or the associated validation response.

In implementations, wherein user device 106 is a non-mobile user device, data indicative of the web session can be forwarded to a mobile user device. For instance, the data indicative of the web session can be provided to user device 108. User device s 106 and 108 can both be associated with the same user. The data can be provided to user device 108 using various suitable communication techniques, such as Bluetooth, sound waves, barcodes, etc. User device 108 can then determine a device profile associated with user device 108, and provide the device profile to CAPTCHA system 102 along with a validation request. User verifier 112 can then determine whether to validate user device 106 based at least in part on the device profile and/or associated validation response of user device 108.

In some implementations, user verifier 112 can determine whether to provide a verification challenge to the user. In particular, user verifier 112 can determine whether to verify a user without the need for a verification challenge. In this manner, user verifier 112 may determine whether to provide a verification challenge to the user based at least in part on the validation response associated with user device 106 or 108. For instance, if user device 106 or 108 has a positive validation response, user verifier 112 may verify the user (e.g. grant the user access to the online resource) without first providing the user with a verification challenge. In some implementations, user verifier may verify the user by providing a verification token or certificate to user device 106. If user device 106 or 108 has a negative validation response, or if the user device cannot otherwise be validated, user verifier 112 may determine to provide a verification challenge to the user.

In this manner, CAPTCHA system 102 may further include a CAPTCHA generator configured to generate or select one or more verification (e.g. CAPTCHA) challenges, and to provide the verification challenge(s) to the user. As indicated, the CAPTCHA challenge may include one or more objects, such as one or more images, words having distorted text, audio files, video files, etc. The CAPTCHA challenge may further include instructions prompting the user to interact with the object(s) and/or the CAPTCHA challenge in a specified manner. User verifier 112 may then determine whether to verify the user based at least in part on one or more user responses to the verification challenge received from user device 106.

System 100 further includes a resource provider 104. Resource provider 104 can be associated with an online or other service. Resource provider 104 can receive a request from a user device for access to the online resource or service. In response to the request, resource provider 104 can coordinate with CAPTCHA system 102 to determine whether to verify the user device.

Figure 2:
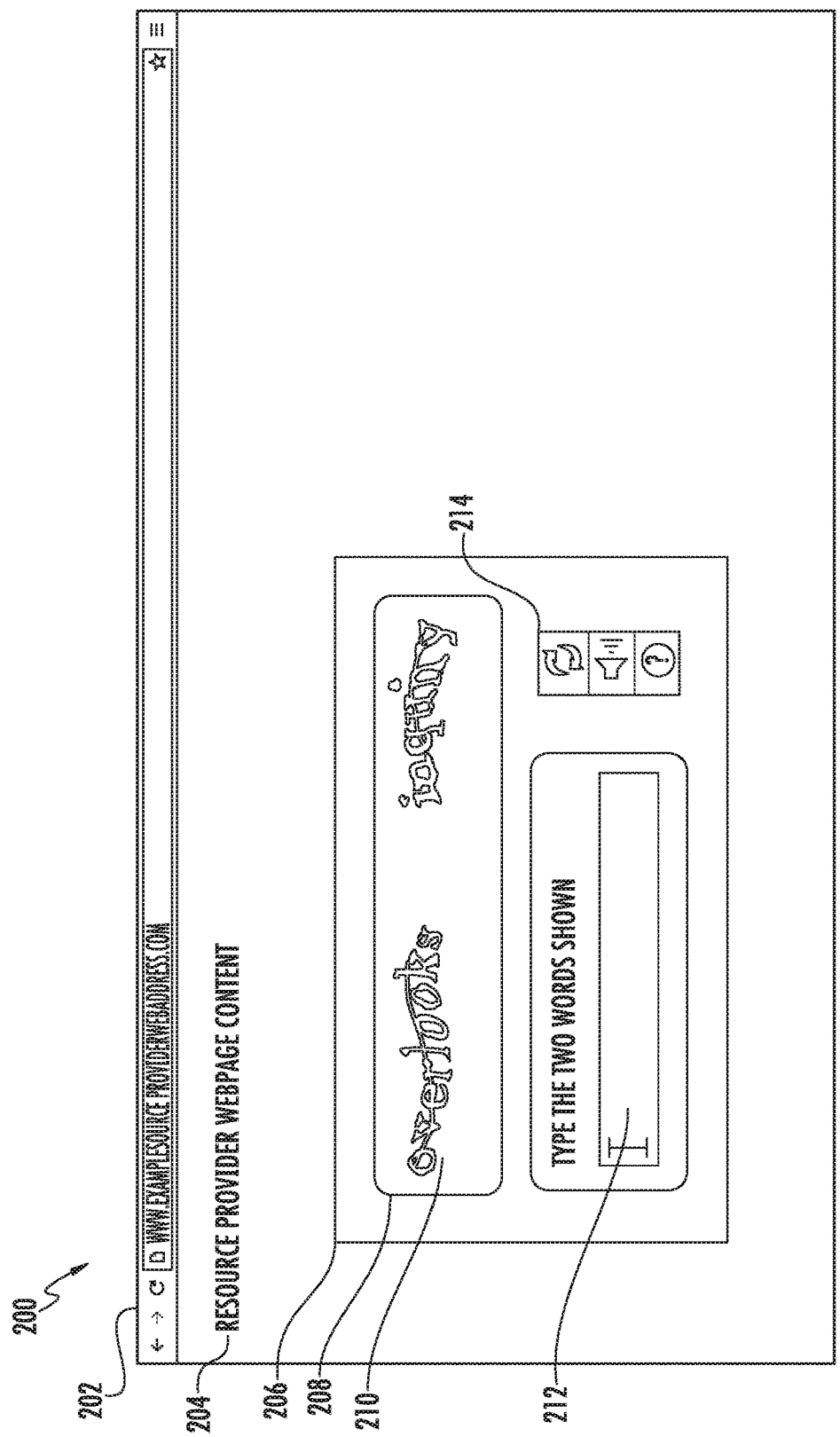
FIG. 2 depicts an example verification challenge according to example embodiments of the present disclosure.

When it is determined to provide a verification challenge to a user device, the verification challenge can be provided for display in a user interface associated with the user device. For instance, FIG. 2 depicts an example user interface 200 according to example embodiments of the present disclosure. In particular, user interface 200 can be provided within a web browser window 202 of a user computing device, such as user device 106 of FIG. 1.

User interface 200 can include content 204 provided by the resource provider, such as resource provider 104. In addition, user interface 200 can include an inline frame 206. Inline frame 206 can serve as a portal for the user computing device to communicate directly with a computerized CAPTCHA system.

Inline frame 206 can provide a challenge prompt area 208, a challenge response field 212, and a control panel 214. A challenge prompt 210 can be displayed within challenge prompt area 208.

Challenge response field 212 can provide an opportunity for the user to input text as a response to the challenge. Control panel 214 can include various controls for interacting with the computerized CAPTCHA challenge system, including, for example, a control to receive a new challenge, a control to receive an audio challenge, and a help or information button. It will be appreciated that various other suitable CAPTCHA challenges can be used without deviating from the scope of the present disclosure. For instance, one or more image based CAPTCHA challenges can be used.

Figure 3:
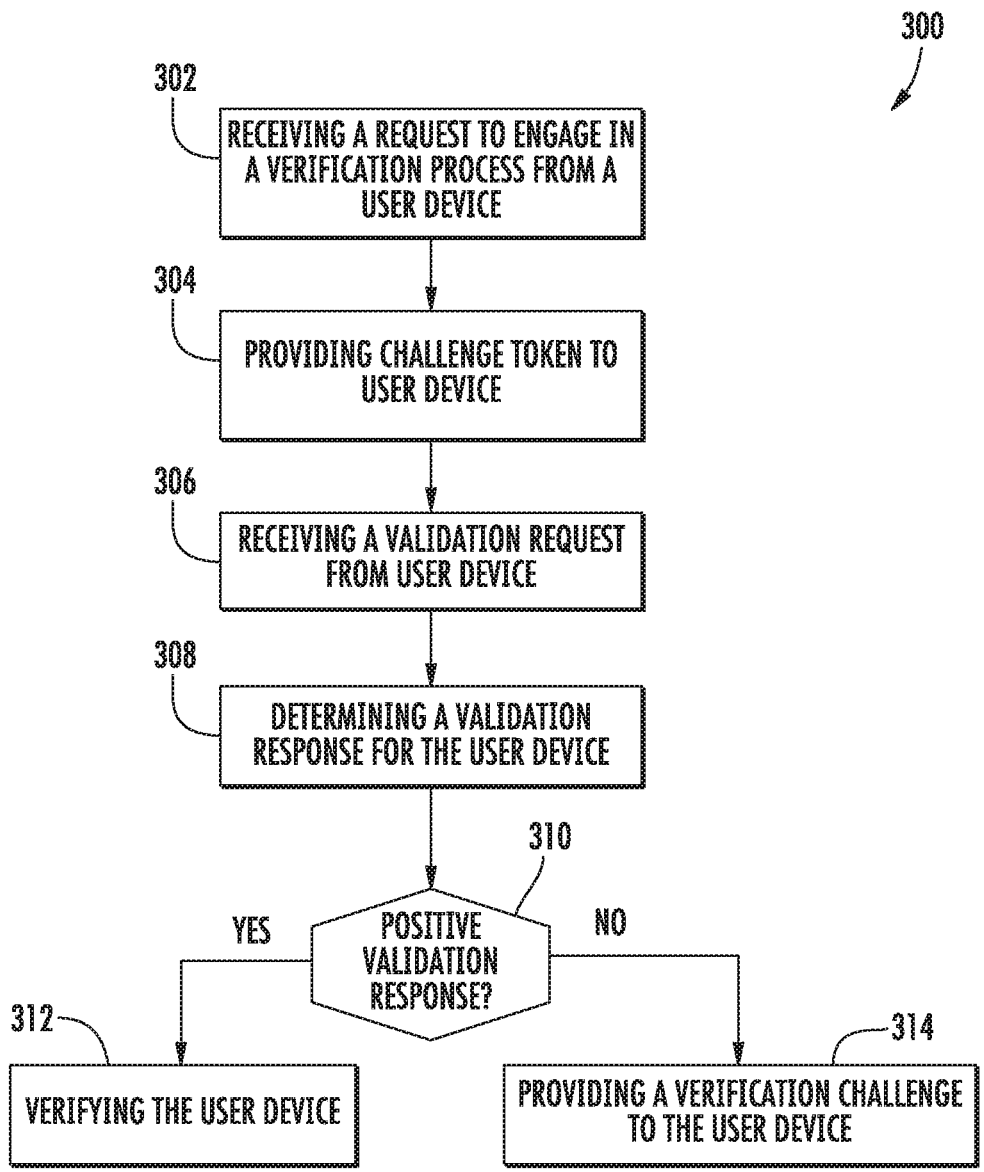
FIG. 3 depicts a flow diagram of an example method of verifying a mobile user device according to example embodiments of the present disclosure.

FIG. 3 depicts a flow diagram of an example method (300) of verifying a user. Method (300) can be implemented by one or more computing devices, such as one or more of the computing devices depicted in FIG. 6. In particular implementations, one or more aspects of the method (300) can be implemented by CAPTCHA system 102 depicted in FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving a request to engage in a verification process from a user. For instance, the request to engage in the verification process can be associated with a request to access an online resource from a resource provider. The request can be provided by a user device associated with the user. In particular, the request can be associated with a web session between a resource provider and the user device. For instance, non-limiting examples of online resources include a cloud-based email client, a social media account or content, software as a service, an online auction interface, a financial services account, an online game, a data library, a code library, an arbitrary web-service, or any other suitable resource.

At (304), method (300) can include providing a challenge token to the user device. For instance, the challenge token can include data identifying a communication session between a CAPTCHA system and the user device. The challenge token can be provided to the user device in response to receiving the request to engage in the verification process.

At (306), method (300) can include receiving a validation request from the user device. In some implementations, the validation request can have an associated device profile of the user device. For instance, the device profile can be determined by the user device in response to receiving the challenge token. As indicated, the device profile can be determined based at least in part on one or more hardware and/or software characteristics of the user device. The device profile can include data indicative of one or more device configurations of the user device.

As indicated above, the device profile may be determined by an application stored on the user device. For instance, the challenge token may be provided from a web browser on the user device to the application. The application can be configured to determine the device profile and to send the validation request to the CAPTCHA system.

At (308), method (300) can include determining a validation response for the user device. The validation response can be determined based at least in part on the device profile and/or the validation request from the user device. In some implementations, the validation response can be determined based at least in part on one or more acceptable device configurations. For instance, a database, look-up-table, or other aggregation of data indicative of acceptable device configurations can be accessed and compared against the device profile of the user device. In this manner, if the device profile of the user device matches or otherwise aligns with one or more acceptable device configurations, the user device can receive a positive validation response. In some implementations, if the device profile does not match or align with an acceptable user device, the user device may receive a negative validation response.

At (310), method (300) can include determining whether the user device has received a positive validation response (e.g. whether the user device has been validated). If the user device has been validated, method (300) can include verifying the user device (312). For instance, as indicated above, verifying the user device can include granting the user device access to the online resource. For instance, in some implementations, verifying the user device may include providing a verification token or certificate to the user device.

Referring back to (310), if the validation response associated with the user device is a negative validation response, method (300) can include providing a verification challenge to the user device (314). For instance, the verification challenge can be a CAPTCHA challenge including one or more objects and instructions prompting the user of the user device to interact with the CAPTCHA challenge in a specified manner. Verification of the user device can then be determined based at least in part on one or more user responses to the verification challenge. For instance, if the user "passes" the verification challenge, the user device may be granted access to the online resource.

In some implementations, if the validation response associated with the user device is a negative validation response, the verification request can be denied without providing a verification challenge to the user. For instance, the user can be denied access to the online resource based at least in part on the validation response without receiving a verification challenge.

In some implementations, the validation response may not be dispositive in determining whether to verify a user without having to provide a verification challenge to the user. For instance, if the user device receives a negative validation response, the user device may still be validated and/or verified based at least in part on one or more additional signals that may indicate that the user is a human user, such as a phone number associated with the user device, participation in one or more online or web-services by the user device, and/or various other suitable signals. In this manner, a verification challenge may not be presented to the user device even if the user device has negative validation response.

In some implementations, verification of a user device without providing a verification challenge to the user device may be determined based at least in part on a number of CAPTCHA sessions the user device has participated in. For instance, if the user device exceeds a threshold number of CAPTCHA session within a time period, the user device may not be verified.

Figure 4:
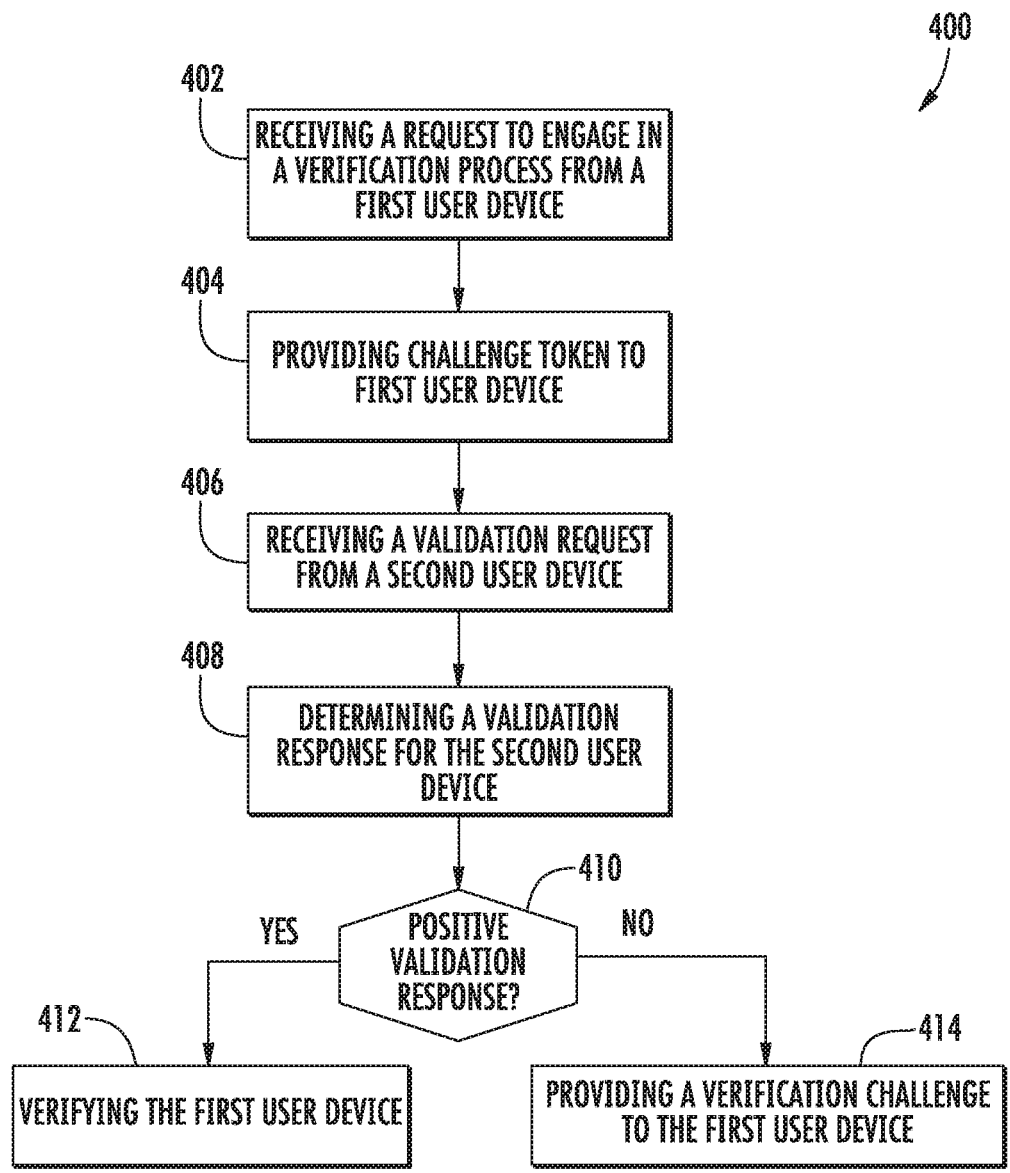
FIG. 4 depicts a flow diagram of an example method of verifying a non-mobile user device according to example embodiments of the present disclosure.

As indicated above, in some implementations, a validation response for a second mobile device can be used to verify a first user device. For instance, FIG. 4 depicts a flow diagram of an example method (400) of verifying a user. Method (400) can be implemented by one or more computing devices, such as one or more of the computing devices depicted in FIG. 6. In particular implementations, one or more aspects of the method (400) can be implemented by CAPTCHA system 102 depicted in FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include receiving a request to engage in a verification process from a first user device. For instance, the first user device can be a non-mobile user device, such as a laptop computing device, a desktop computing device, or any other suitable non-mobile computing device. The first user device can be operated by or otherwise be associated with a user. The request to engage in the verification process can be provided by a web browser as part of a web session between the web browser and a resource provider.

At (404), method (400) can include providing a challenge token to the first user device. For instance, the challenge token can be provided to the first user device in response to receiving the request to engage in the verification process from the first user device.

At (406), method (400) can include receiving a validation request from a second user device. The second user device can also be operated by or otherwise be associated with the user. For instance, in some implementations, the first user device can provide data indicative of the web session to the second user device. As an example, the first user device may forward the challenge token to the second user device. The second user device can then determine a device profile associated with the second user device. As indicated above, the device profile can be determined based at least in part on one or more hardware and/or software characteristics of the second user device. The second user device can then provide a validation request to the CAPTCHA system. The validation request can include the device profile for the second user device.

As described above, a non-mobile device can forward the challenge token to a mobile device. In this manner, it can be determined whether the user device is a mobile device or a non-mobile device. The user device can then determine whether to forward the challenge token to a second (mobile) user device based at least in part on whether the user device is a mobile or non-mobile user device.

At (408), method (400) can include determining a validation response for the second user device. As described above, the validation response can be determined by comparing the device profile of the second user device to one or more acceptable device configurations. In this manner, if the second user device (e.g. the device profile) is an acceptable device, the second user device can receive a positive validation response. If the second user device is not an acceptable device, the second user device can receive a negative validation response.

At (410), method (400) can include determining whether the validation response associated with the second user device is a positive validation response or a negative validation response. If the validation response is positive, method (400) can include verifying the first user device (412). In this manner, the first user device can be verified without providing a verification challenge to the first user device.

Referring back to (410), if the validation response is negative, method (400) can include providing a verification challenge to the first user device (414). In some implementations, if the validation response associated with the user device is a negative validation response, the verification request can be denied without providing a verification challenge to the user.

As indicated above, in some implementations, the validation response may not be dispositive of the verification process. For instance, the first user device may still be verified without a verification challenge even with a negative validation response based at least in part on one or more additional signals. As another example, a verification challenge may be provided to the first user device even if the first user device has an associated positive validation response. For instance, in such implementations, the difficulty level of the verification challenge may be adjusted based at least in part on the validation response.

Figure 5:
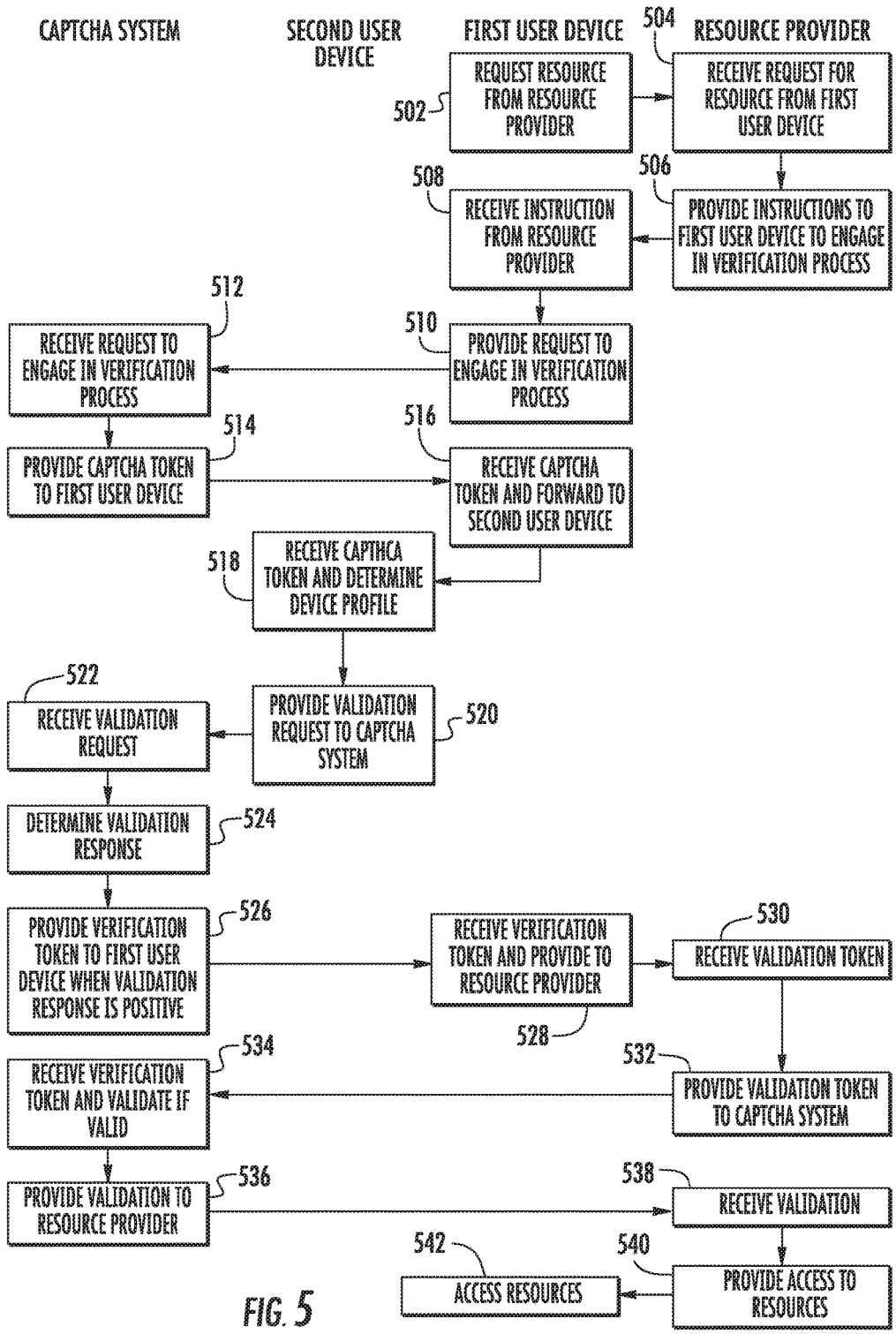
FIG. 5 depicts a flow diagram of an example method of verifying a user device according to example embodiments of the present disclosure.

FIG. 5 depicts a flow diagram of an example method (500) of verifying a user according to example embodiments of the present disclosure. FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (502) a first user device can request a resource or access to an online service from a resource provider. At (504) the resource provider can receive the request from the user device.

At (506) the resource provider can instruct the user device to engage in a verification process directly with a computerized CAPTCHA system. At (508) the user device can receive the instructions from the resource provider to directly engage with the computerized CAPTCHA system. As an example, the resource provider can instruct the user device at (506) by redirecting a browser of the user device so that it directly connects with the computerized CAPTCHA system and begins the verification process.

As another example, at (506) the resource provider can provide the user device with a client-side script that, when executed by the user device, causes the user device to directly engage with the computerized CAPTCHA system. For example, the client-side script can be included in an inline frame, embedded object, portlet, or other embedded application or widget. In some implementations, the client-side script can be included in a plug-in provided from the computerized CAPTCHA system to the resource provider. Furthermore, in some implementations, at (506) the resource provider can provide the user device with a public key identifying the resource provider to the computerized CAPTCHA system.

At (510) the user device can transmit a request directly to the computerized CAPTCHA system to engage in a verification process. At (512) the computerized CAPTCHA system can receive the request from the user device.

As an example, the request transmitted at (510) can be formatted according to an application programming interface associated with the computerized CAPTCHA system. For example, the request can be transmitted as a result of executing a client-side script provided to the user device at (506). Furthermore, in some implementations, the request transmitted at (510) can include a public key associated with the resource provider.

At (514) the computerized CAPTCHA system can provide a CAPTCHA token to the first user device. As described above, the CAPTCHA token can include data identifying the first user device and/or the CAPTCHA session between the CAPTCHA system and the first user device.

At (516) the user device can receive the CAPTCHA token from the computerized CAPTCHA system and provide the CAPTCHA token to a second user device. As indicated above, in some implementations, the CAPTCHA token can be provided to second user device based at least in part on whether the first user device is a mobile user device. At (518) the second user device can receive the CAPTCHA token and can determine a device profile associated with the second user device. At (520) the second user device can provide a validation request to the CAPTCHA system. The validation request can include the device profile.

At (522), the computerized CAPTCHA system can receive the validation request. At (524), the computerized CAPTCHA system can determine a validation response for the second user device based at least in part on the device profile. For instance, a positive validation response can correspond to a validated user device, and a negative validation response can correspond to a user device that has not been validated.

At (526) the computerized CAPTCHA system can generate a verification token and provide it to the first user device based at least in part on the validation response. For instance, a verification token can be provided to the first user device when the validation response is positive (e.g. when the second user device is validated). At (528) the user device can receive the verification token from the computerized CAPTCHA system, and can provide the verification token to the resource provider.

As an example, the computerized CAPTCHA system can generate the verification token and provide it to the user device at (526) based at least in part on the validation response determined at (524). The verification token can be an authentication certificate or other security or authentication device or mechanism. For example, in some implementations, the verification token can include a hash of a user device identifier or other information or can incorporate the resource provider's public key.

It will be appreciated that, in some implementations, steps (510)-(526) can be considered a verification process. Further, in some implementations, steps (510)-(526) can occur via an inline frame, embedded object, portlet, or other embedded widget or application included in the resource provider's website.

At (528) the first user device can provide the verification token to the resource provider. At (530) the resource provider can receive the verification token from the first user device.

At (532) the resource provider can transmit the verification token to the computerized CAPTCHA system. In some implementations, at (532) the resource provider can also transmit its private key to the computerized CAPTCHA system together with the verification token.

At (534) the computerized CAPTCHA system can provide a validation of the verification token to the resource provider if the verification token is valid. If the verification token is invalid or has been tampered with, then the computerized CAPTCHA system can inform the resource provider that the verification token is invalid.

At (536), the computerized CAPTCHA system can provide the data indicative of the validation to the resource provider. At (538), the resource provider can receive the validation of the verification token from the computerized CAPTCHA system. In response to receiving the validation at (538), at (540) the resource provider can provide the user device with access to the resource. At (542) the user device can access the resource. In some implementations, (532)-(538) can be bypassed, and method (500) can proceed from (530) to (540).

Figure 6:
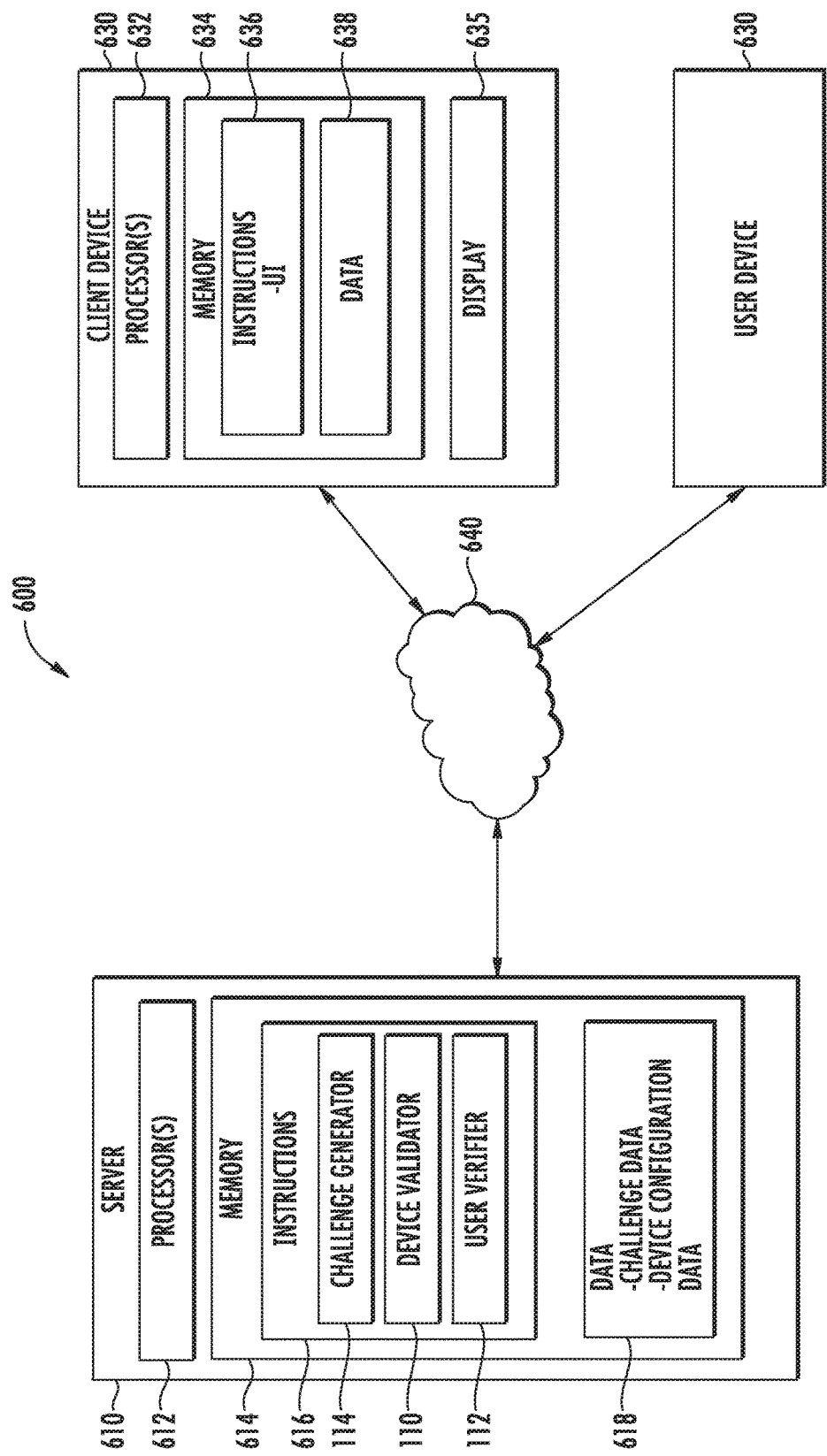
FIG. 6 depicts an example system according to example embodiments of the present disclosure.

FIG. 6 depicts an example computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host computerized CAPTCHA system, such as CAPTCHA system 102 depicted in FIG. 1. The server 610 can be implemented using any suitable computing device(s). The server 610 can have one or more processors 612 and one or more memory devices 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 616 can be executed by the one or more processors 612 to implement a device validator 110, a user verifier 112, and a CAPTCHA generator 114 described with reference to FIG. 1.

As shown in FIG. 6, the one or more memory devices 614 can also store data 618 that can be retrieved, manipulated, created, or stored by the one or more processors 612. The data 618 can include, for instance, challenge data, device configuration data, and other data. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 6, any number of client devices 630 can be connected to the server 610 over the network 640. Each of the client devices 630 can be any suitable type of computing device, such as a general purpose computer, special purpose computer, laptop, desktop, mobile device, navigation system, smartphone, tablet, wearable computing device, a display with one or more processors, or other suitable computing device. For instance, in some implementations, a client device may be a mobile user device, or a non-mobile user device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images or performing other specialized calculations, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface module for displaying CAPTCHA challenges determined according to example aspects of the present disclosure.

The client device 630 of FIG. 6 can include various input/output devices for providing and receiving information from a user, such as a touch screen, touch pad, data entry keys, speakers, and/or a microphone suitable for voice recognition. For instance, the client device 630 can have a display device 635 for presenting a user interface displaying CAPTCHA challenges according to example aspects of the present disclosure.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
receiving, by one or more computing devices, a request to engage in a verification process for a first user device to gain access to an online resource during a web session;
responsive to receiving the request to engage in the verification process, providing, by the one or more computing devices and to the first user device, a challenge token comprising data identifying a communication session between the one or more computing devices and the first user device;
receiving, by the one or more computing devices and from a second user device to which the web session has been connected:
a copy of the challenge token forwarded by the first user device to the second user device using a short-range communication technique and in response to a determination that the first user device is a non-mobile user device, and
a validation request comprising a device profile associated with the second user device;
determining, by the one or more computing devices, whether to validate the second user device based at least in part on:
the validation request, and
a determination of whether the device profile associated with the second user device aligns with or otherwise matches one or more acceptable device configurations indicating that the first user device is being operated by a human; and
responsive to successfully validating the second user device, granting, by the one or more computing devices, the first user device access to the online resource.

2. The computer-implemented method of claim 1, wherein:
the first user device comprises one or more of a desktop computing device or a laptop computing device; and
the second computing device comprises one or more of a smartphone computing device, a tablet computing device, or a wearable computing device.

3. The computer-implemented method of claim 1, wherein the device profile associated with the second user device is generated by an application associated with the second user device and configured to determine the device profile in response to being forwarded one or more of data indicative of the web session or the request to engage in the verification process.

4. The computer-implemented method of claim 1, wherein determining whether to validate the second user device comprises determining whether to validate the second user device based at least in part on one or more of:
a phone number associated with the second user device;
one or more wireless comedians associated with the second user device; or
a number of completely automated public Turing test to tell computers and humans apart (CAPTCHA) challenges previously solved in association with the second user device.

5. The computer-implemented method of claim 1, wherein granting the first user device access to the online resource comprises adjusting, based at least in part on the determination to validate the second user device, a difficulty of a verification challenge provided by the one or more computing devices to the first user device.

6. The computer-implemented method of claim 1, wherein granting the first user device access to the online resource comprises providing, to the first user device, one or more of a verification token or certificate for provision by the first user device to a resource provider associated with the online resource.

7. The computer-implemented method of claim 1, wherein granting the first user device access to the online resource comprises providing, to the second user device, a verification token for input by the user into the first user device.

8. The computer-implemented method of claim 1, wherein the request is formatted in accordance with an application programming interface (API) associated with the one or more computing devices.

9. The computer-implemented method of claim 1, wherein:
the online resource is associated with a resource provider; and
the request comprises a public key associated with the resource provider.

10. The computer-implemented method of claim 9, wherein:
granting the first user device access to the online resource comprises providing, to the first user device, a verification token for provision by the first user device to the resource provider; and
the verification token comprises the public key associated with the resource provider.

11. The computer-implemented method of claim 10, wherein the verification token comprises a hash of a user device identifier.

12. The computer-implemented method of claim 10, wherein granting the first user device access to the online resource comprises receiving, by the one or more computing devices and from the resource provider, the verification token and a private key associated with the resource provider.

13. A system comprising:
one or more processors; and
a memory storing instructions that when executed by the one or more processors cause the system to perform operations comprising:
receiving a request to engage in a verification process for a first user device to gain access to an online resource during a web session;
responsive to receiving the request to engage in the verification process, providing, to the first user device, a challenge token comprising data identifying a communication session between the system and the first user device;
receiving, from a second user device to which the web session has been connected:
a copy of the challenge token forwarded by the first user device to the second user device using a short-range communication technique and in response to a determination that the first user device is a non-mobile user device, and
a validation request comprising a device profile associated with the second user device;
determining whether to validate the second user device based at least in part on:
the validation request, and
a determination of whether the device profile associated with the second user device aligns with or otherwise matches one or more acceptable device configurations indicating that the first user device is being operated by a human; and responsive to successfully validating the second user device, granting the first user device access to the online resource.

14. The system of claim 13, wherein the device profile associated with the second user device is generated by an application associated with the second user device and configured to determine the device profile in response to being forwarded one or more of data indicative of the web session or the request to engage in the verification process.

15. The system of claim 13, wherein determining whether to validate the second user device comprises determining whether to validate the second user device based at least in part on one or more of:
   a phone number associated with the second user device;
   one or more wireless connections associated with the second user device; or
   a number of completely automated public Turing test to tell computers and humans apart (CAPTCHA) challenges previously solved in association with the second user device.

16. The system of claim 13, wherein granting the first user device access to the online resource comprises adjusting, based at least in part on the determination to validate the second user device, a difficulty of a verification challenge provided by the one or more computing devices to the first user device.

17. One or more non-transitory computer-readable media comprising instructions that when executed by one or more computers cause the one or more computers to perform operations comprising:
   receiving a request to engage in a verification process for a first user device to gain access to an online resource during a web session;
   responsive to receiving the request to engage in the verification process, providing, to the first user device, a challenge token comprising data identifying a communication session between the one or more computers and the first user device;
   receiving, from a second user device to which the web session has been connected:
      a copy of the challenge token forwarded by the first user device to the second user device using a short-range communication technique and in response to a determination that the first user device is a non-mobile user device, and
      a validation request comprising a device profile associated with the second user device;
   determining whether to validate the second user device based at least in part on:
      the validation request, and
      a determination of whether the device profile associated with the second user device aligns with or otherwise matches one or more acceptable device configurations indicating that the first user device is being operated by a human; and
   responsive to successfully validating the second user device, granting the first user device access to the online resource.

18. The one or more non-transitory computer-readable media of claim 17, wherein the device profile associated with the second user device is generated by an application associated with the second user device and configured to determine the device profile in response to being forwarded one or more of data indicative of the web session or the request to engage in the verification process.

19. The one or more non-transitory computer-readable media of claim 17, wherein determining whether to validate the second user device comprises determining whether to validate the second user device based at least in part on one or more of:
   a phone number associated with the second user device;
   one or more wireless connections associated with the second user device; or
   a number of completely automated public Turing test to tell computers and humans apart (CAPTCHA) challenges previously solved in association with the second user device.

20. The one or more non-transitory computer-readable media of claim 17, wherein granting the first user device access to the online resource comprises adjusting, based at least in part on the determination to validate the second user device, a difficulty of a verification challenge provided by the one or more computing devices to the first user device.

* * * * *